(12) United States Patent
Wu

(10) Patent No.: US 8,911,159 B2
(45) Date of Patent: Dec. 16, 2014

(54) CIRCUIT BOARD ASSEMBLY HAVING OPTICAL TRANSCEIVER FOR SIGNAL TRANSMISSION

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/559,566

(22) Filed: Jul. 26, 2012

(65) Prior Publication Data

US 2013/0279859 A1    Oct. 24, 2013

(30) Foreign Application Priority Data

Apr. 18, 2012  (TW) .............................. 101113863 A

(51) Int. Cl.
*G02B 6/36* (2006.01)
(52) U.S. Cl.
USPC .......................................................... 385/89
(58) Field of Classification Search
USPC .......................................................... 385/89
See application file for complete search history.

(56) References Cited

U.S. PATENT DOCUMENTS 6,393,184 B1 * 5/2002 Day et al. ......................... 385/49
2005/0220427 A1 * 10/2005 Therisod ......................... 385/92

* cited by examiner

*Primary Examiner* — Jerry Blevins
(74) *Attorney, Agent, or Firm* — Novak Druce Connolly Bove + Quigg LLP

(57) ABSTRACT

A circuit board assembly includes a circuit board, a first optical transceiver electrically connected to the circuit board, a first transparent shell optically coupled with the first optical transceiver, a second optical transceiver electrically connected to the circuit board, a second transparent shell optically coupled with the second optical transceiver, and a plurality of light wave guides optically coupled with the first transparent shell and the second transparent shell. The first optical transceiver sends first light signals. The first light signals are transmitted through the first transparent shell, the light wave guides, and the second transparent shell and are received by the second optical transceiver. The second optical transceiver sends second light signals. The second light signals are transmitted through the second transparent shell, the light wave guides, and the first transparent shell and are received by first optical transceiver.

12 Claims, 4 Drawing Sheets

US 8,911,159 B2

CIRCUIT BOARD ASSEMBLY HAVING OPTICAL TRANSCEIVER FOR SIGNAL TRANSMISSION

BACKGROUND

1. Technical Field

The present disclosure relates to circuit board assemblies and, particularly, to a circuit board assembly having optical transceivers for signal transmission.

2. Description of Related Art

Signal transmission speed has being significantly increased between two electronic devices for using optical transceivers. Usually, each electronic device includes a circuit board and an optical transceiver electrically connected to the circuit board. The optical transceivers transmit optical signals therebetween and each optical transceiver converts the optical signal to electric signals. Then the electric signals are transmitted to other electric elements such as a processor through wire leads of the circuit boards of respective electronic devices. However, electromagnet interference (EMI) readily influents the electric signals and transmission speed of the electric signals cannot satisfy currently high speed requirement for signal transmission.

Therefore, it is desirable to provide a circuit board assembly, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
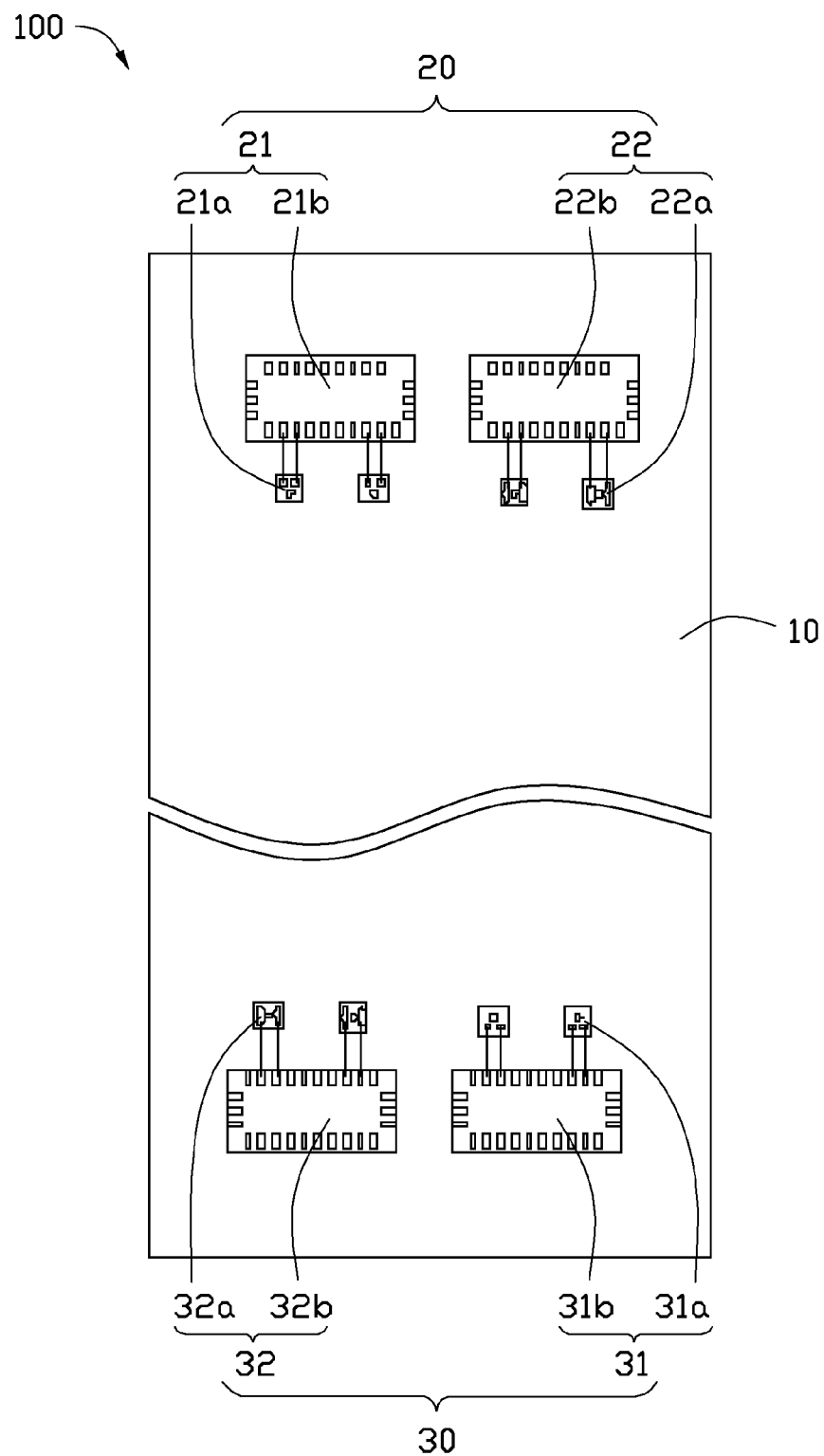
FIG. 1 is a partially assembled view of a circuit board assembly according to a first embodiment, which is viewed from a top plan angle.
Figure 2:
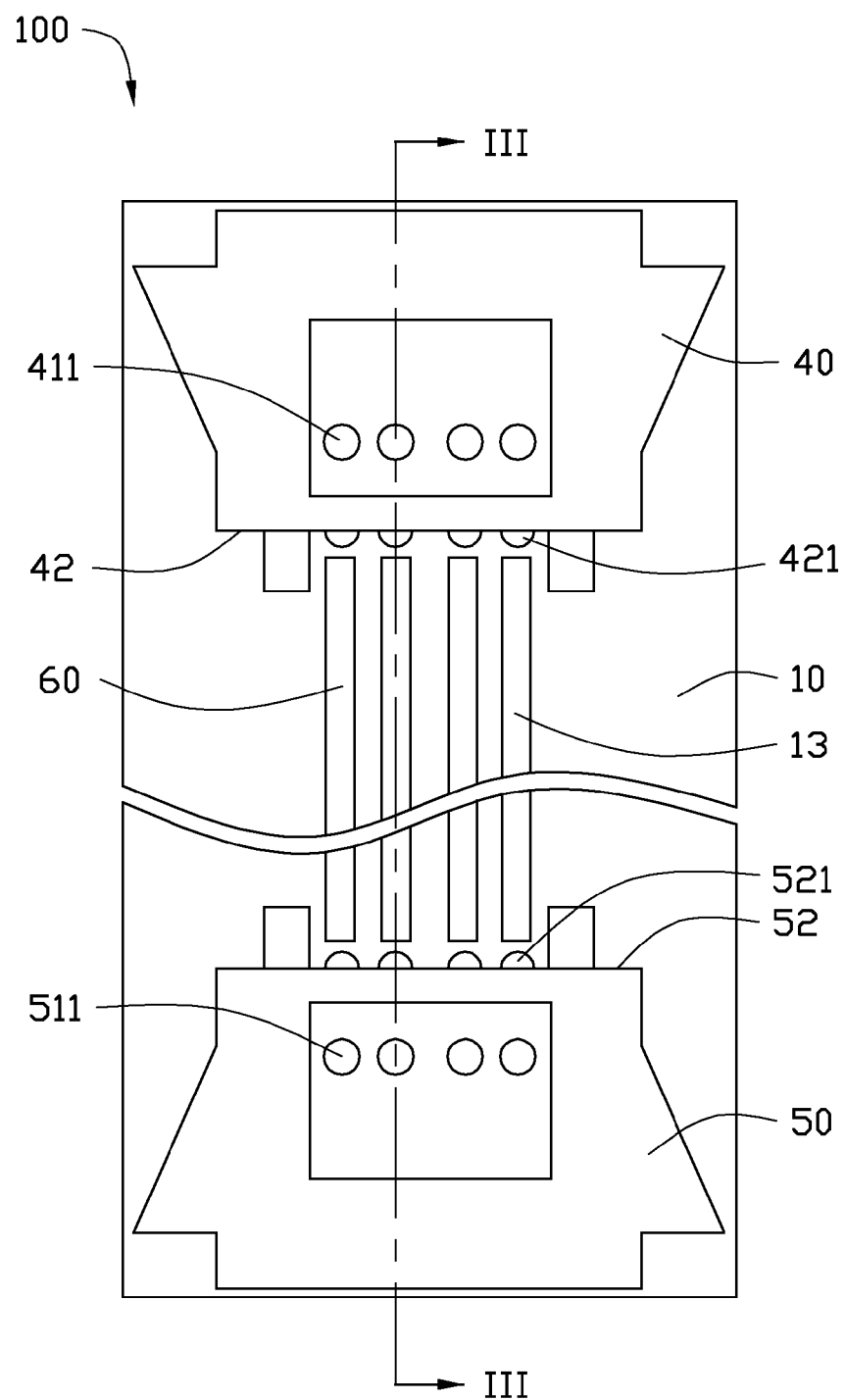
FIG. 2 is an assembled view of the circuit board assembly of FIG. 1.

FIGS. 1 and 2 illustrate a circuit board assembly 100 according to a first embodiment. The circuit board assembly 100 includes a circuit board 10, a first optical transceiver 20, a second optical transceiver 30, a first transparent shell 40, a second transparent shell 50, and four light wave guides 60.

The circuit board 10 can be a grid printed circuit board or a flexible printed circuit board. In the embodiment, the circuit board 10 is a grid printed circuit board.

The first optical transceiver 20 includes a first light emitting module 21 and a first light receiving module 22. The first light emitting module 21 includes two first laser diodes 21a and a first laser driver 21b electrically connected to the first laser diodes 21a. The first light receiving module 22 includes two first photo diodes 22a and a first photoelectric converter 22b electrically connected to the first photo diodes 22a. The first light emitting module 21 and the first light receiving module 22 are mounted on the circuit board 10 through a chip on board (COB) technology.

The second optical transceiver 30 is similar to the first optical transceiver 20 and includes a second light emitting module 31 and a second light receiving module 32. The second light emitting module 31 includes two second laser diodes 31a and a second laser driver 31b electrically connected to the second laser diodes 31a. Each second laser diode 31a is optically coupled with a respective one of the first photo diodes 22a through a respective one of the light wave guides 60. The second light receiving module 32 includes two second photo diodes 32a and a second photoelectric converter 32b electrically connected to the second photo diodes 32a. Each second photo diodes 32a is optically coupled with a respective one of the first laser diodes 21a through a respective one of the light wave guides 60. The second light emitting module 31 and the second light receiving module 32 are also mounted on the circuit board 10 through the COB technology.

Figure 3:
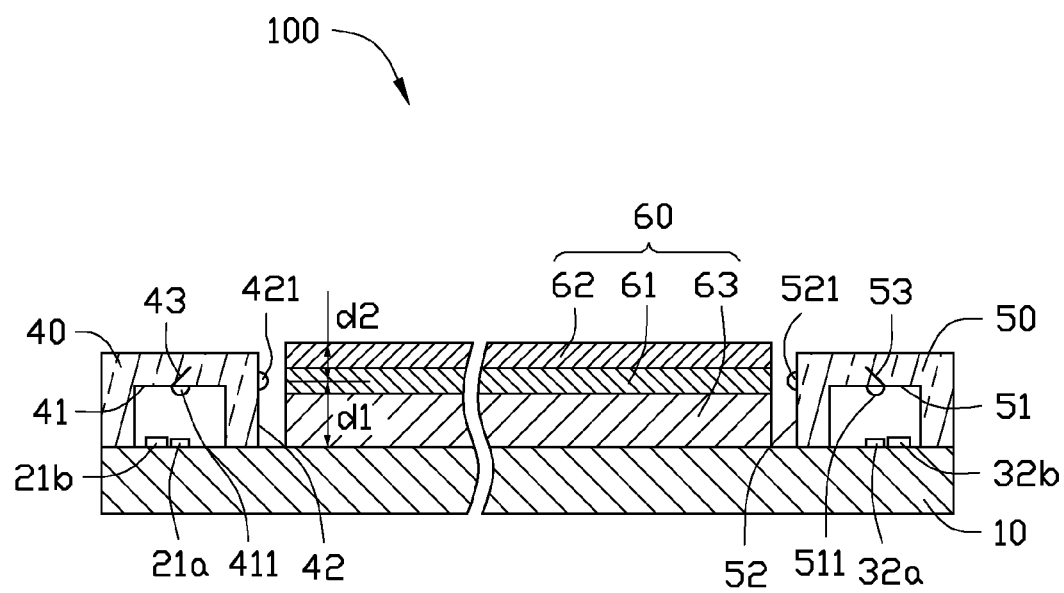
FIG. 3 is a cross-sectional schematic view taken alone a line III-III of FIG. 2.

Also referring to FIGS. 2 and 3, the first transparent shell 40 is made of plastic or resin. The first transparent shell 40 is mounted on the circuit board 10 and optically coupled with the first optical transceiver 20. The first transparent shell 40 includes a first bottom surface 41 facing the circuit board 10, a first side surface 42 perpendicular to the first bottom surface 41, and four first reflecting elements 43. The first transparent shell 40 further includes four first vertical lenses 411 protruding from the first bottom surface 41 towards the circuit board 10 and four first horizontal lenses 421 protruding from the first side surface 42 towards the second optical transceiver 30. The four first vertical lenses 411 are uniformly distributed in a line and each first vertical lens 411 is aligned with a respective one of the first laser diodes 21a and the photo diodes 22a. The four first horizontal lenses 421 are uniformly distributed in a line. An optical axis of each first horizontal lens 421 perpendicularly intersects with an optical axis of a corresponding first vertical lens 411. Each first reflecting member 43 is arranged at an intersection of the optical axes of the corresponding first vertical lens 411 and first horizontal lens 421 and thus is positioned in a light path between a first vertical lens 411 and a corresponding first horizontal lens 421. An included angle between the first reflecting elements 43 and the first bottom surface 41 is about 45 degrees. Each first reflecting member 43 is used to reflect light signals from a first vertical lens 411 to a corresponding first horizontal lens 421 or reflect light signals from a first horizontal lens 421 to a corresponding first vertical lens 411.

The second transparent shell 50 is similar to the first transparent shell 400 and is mounted on the circuit board 10 and optically coupled with the second optical transceiver 30. The second transparent shell 50 includes a second bottom surface 51 facing the circuit board 10, a second side surface 52 perpendicular to the second bottom surface 51, and four second reflecting elements 53. The second transparent shell 50 further includes four second vertical lenses 511 protruding from the second bottom surface 51 towards the circuit board 10 and four second horizontal lenses 521 protruding from the second side surface 52 towards the first optical transceiver 20. The four second vertical lenses 511 are uniformly distributed in a line and each second vertical lens 511 is aligned with a respective one of the second laser diodes 31a and the second photo diodes 32a. The four second horizontal lenses 521 are uniformly distributed in a line. An optical axis of each second horizontal lens 521 perpendicularly intersects with an optical axis of a corresponding a second vertical lens 511. Each second reflecting member 53 is arranged at an intersection of the optical axes of the corresponding second vertical lens 511 and second horizontal lens 521 and thus is positioned in a light path between a second vertical lens 511 and a corresponding second horizontal lens 521. An included angle between the second reflecting elements 53 and the second bottom surface 51 is about 45 degrees. Each second reflecting member 53 is used to reflect light signals from a second vertical lens 511 to a corresponding second horizontal lens 521 or reflect light signals from a second horizontal lens 521 to a corresponding second vertical lens 511.

The light wave guides 60 are directly positioned on the circuit board 10 by a planar light wave guide circuit (PLC) technology and arranged between and optically coupled with the first transparent shell 40 and the second transparent shell 50. Each light wave guide 60 includes a medium layer 61, an upper layer 62, and a lower layer 63. The medium layer 61 is sandwiched and protected by the upper layer 62 and the lower layer 63 and is used to transmit light signal. Two end surfaces of the medium layer 61 face a first horizontal lens 421 and a second horizontal lens 521, respectively. The lower layer 63 is formed on the circuit board 10. A center axis of the medium layer 61 of each light wave guide 60 is aligned with center axes of a first horizontal lens 421 and a second horizontal lens 521. In this embodiment, a thickness of each light wave guide 60 is greater than a distance from each first horizontal lens 421 or each second horizontal lens 521 to the circuit board 10, and a distance d1 from the circuit board 10 to the center axis of the medium layer 61 is greater than a distance d2 from an outer surface of the upper layer 62 to the center axis of the medium layer 61. A thickness of the lower layer 63 is greater than a thickness of the upper layer 62.

In use, when the first optical transceiver 20 sends first light signals to the second optical transceiver 30, the first laser driver 21b drives the two first laser diodes 21a to emit the first light signals. The first light signals pass through two of the first vertical lenses 411 and incident into the first transparent shell 40. Then the first light signals are reflected by two of the first reflecting elements 43 and emergent from the first transparent shell 40 through two of the first horizontal lenses 421. Then the first light signals are guided into two medium layers 61 of two light wave guides 60 and transmitted to two of the second horizontal lenses 521 and incident into the second transparent shell 50. Then the first light signals are reflected by two of the second reflecting elements 53 and emergent from the second transparent shell 50 through two of the second vertical lenses 511 and projected to the two second photo diodes 32a. The second photoelectric converter 32b converts the first light signals to first electric signals.

When the second optical transceiver 30 sends second light signals to the first optical transceiver 20, the second laser driver 31b drives the two second laser diode 31a to emit the second light signals. The second light signals pass through the other two of the second vertical lenses 511 and incident into the second transparent shell 50. Then the second light signals are reflected by the other two of the second reflecting elements 53 and emergent from the second transparent shell 50 through the other two of the second horizontal lenses 521. Then the second light signals are guided into two medium layers 61 of the other two light wave guides 60 and transmitted to the other two first horizontal lenses 421 and incident into the first transparent shell 40. Then the second light signals are reflected by the other two of first reflecting elements 43 and emergent from the first transparent shell 40 through the other two of the vertical lenses 411 and projected to the two first photo diodes 22a. The first photoelectric converter 22b converts the second light signals to second electric signals.

Figure 4:
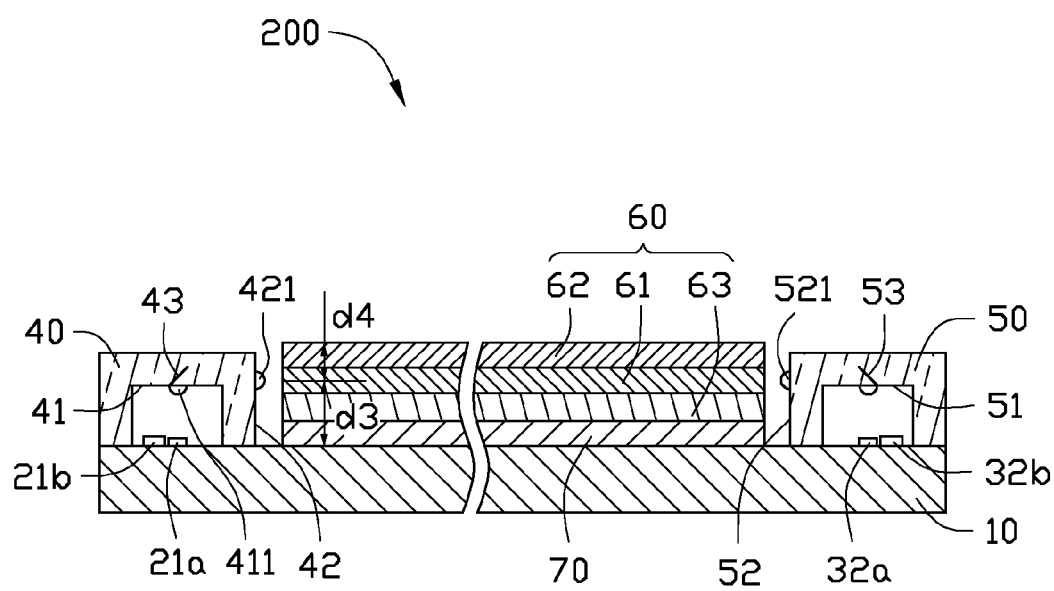
FIG. 4 is a cross-sectional schematic view of a circuit board assembly according to a second embodiment.

FIG. 4 illustrates a circuit board assembly 200 according to a second embodiment. The circuit board assembly 200 is similar to the circuit board assembly 100 of the first embodiment, except that the light wave guides 60 are not directly positioned on the circuit board 10, the circuit board assembly 200 further includes a padding layer 70 formed between the light wave guides 60 and the circuit board 10. The padding layer 70 can be made of resin. The thickness of each light wave guide 60 is less than the distance from each first horizontal lens 421 or each second horizontal lens 521 to the circuit board 10. A sum of thicknesses of each light wave guide 60 and the padding layer 70 is greater than the distance from each first horizontal lens 421 or each second horizontal lens 521 to the circuit board 10. A distance d3 from the circuit board 10 to the center axis of the medium layer 61 is greater than a distance d4 from an outer surface of the upper layer 62 to the center axis of the medium layer 61. The thickness of the lower layer 63 is the same as the thickness of the upper layer 62.

The number of the first laser diodes 21a, the first photo diodes 22a, the second laser diodes 32a, the second photo diodes 32b, and the light wave guides 60 are not limited in this embodiment but can be set depending upon requirements. For example, in other embodiments, only one first laser diode 21a and one first photo diode 22a are employed. Accordingly, one second photo diode 32b, one second laser diode 32a, and two light wave guides 60 are employed. The first transparent shell 40 includes two first vertical lenses 411 and two horizontal lenses 421. The second transparent shell 50 includes two second vertical lenses 511 and two horizontal lenses 521.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A circuit board assembly, comprising:
a circuit board;
a first optical transceiver electrically connected to the circuit board;
a first transparent shell mounted on the circuit board and optically coupled with the first optical transceiver;
a second optical transceiver electrically connected to the circuit board;
a second transparent shell mounted on the circuit board and optically coupled with the second optical transceiver; and
a plurality of light wave guides arranged between the first transparent shell and the second transparent shell and optically coupled with the first transparent shell and the second transparent shell;
wherein the first optical transceiver is configured for sending first light signals, the first light signals are transmitted through the first transparent shell, the light wave guides, and the second transparent shell and are received by the second optical transceiver; the second optical transceiver is configured for sending second light signals, the second light signals are transmitted through the second transparent shell, the light wave guides, and the first transparent shell and are received by the first optical transceiver;
wherein the first optical transceiver comprises a first light emitting module and a first light receiving module, the first light emitting module comprises two first laser diodes and a first laser driver electrically connected to the first laser diodes; the first light receiving module comprises two first photo diodes and a first photoelectric converter electrically connected to the first photo diodes.

2. The circuit board assembly of claim 1, wherein the first transparent shell comprises a first bottom surface facing the circuit board, a first side surface perpendicular to the first bottom surface, four first reflecting elements, four first vertical lenses protruding from the first bottom surface towards the circuit board, and four first horizontal lenses protruding from the first side surface towards the second optical transceiver; each first vertical lens is aligned with a respective one of the first laser diodes and the photo diodes; an optical axis of each first horizontal lens perpendicularly intersects with an optical axis of a corresponding one of the first vertical lenses; each first reflecting member is positioned in a light path between a corresponding one of the first vertical lenses and a corresponding one of the first horizontal lenses for reflecting light signals from the corresponding first vertical lens to the corresponding first horizontal lens or reflect light signals from the corresponding first horizontal lens to the corresponding first vertical lens.

3. The circuit board assembly of claim 1, wherein the second optical transceiver comprises a second light emitting module and a second light receiving module, the second light emitting module comprises two second laser diodes and a second laser driver electrically connected to the second laser diodes, each second laser diode is optically coupled with a respective one of the first photo diodes through a respective one of the light wave guides; the second light receiving module comprises two second photo diodes and a second photoelectric converter electrically connected to the second photo diodes, each second photo diode is optically coupled with a respective one of the first laser diodes through a respective one of the light wave guides.

4. The circuit board assembly of claim 3, wherein the first light emitting module, the first light receiving module, the second light emitting module, and the second light receiving module are mounted on the circuit board through a chip on board technology.

5. The circuit board assembly of claim 3, wherein the second transparent shell comprises a second bottom surface opposite to the circuit board, a second side surface perpendicular to the second bottom surface, four second reflecting elements, four second vertical lenses protruding from the second bottom surface towards the circuit board, and four second horizontal lenses protruding from the second side surface towards the first optical transceiver; each second vertical lens is aligned with a respective one the second laser diodes and the second photo diodes, an optical axis of each second horizontal lens perpendicularly intersects with an optical axis of a corresponding one of the second vertical lenses, each second reflecting member is positioned in a light path between a corresponding one of the second vertical lenses and a corresponding one of the second horizontal lenses for reflecting light signals from the corresponding second vertical lens to the corresponding second horizontal lens or reflect light signals from the corresponding second horizontal lens to the corresponding second vertical lens.

6. The circuit board assembly of claim 5, wherein the light wave guides are directly positioned on the circuit board, each light wave guide comprises a medium layer, an upper layer, and a lower layer; the medium layer is sandwiched and protected by the upper layer and the lower layer and is used to transmit light signals; two end surfaces of the medium layer respectively face a respective first horizontal lens and a respective second horizontal lens.

7. The circuit board assembly of claim 5, wherein the lower layer is positioned on the circuit board, a center axis of the medium layer is aligned with center axes of a corresponding first horizontal lens and a corresponding second horizontal lens; a distance from the circuit board to the center axis of the medium layer is greater than a distance from an outer surface of the upper layer to the center axis of the medium layer.

8. The circuit board assembly of claim 7, wherein a thickness of the lower layer is greater than a thickness of the upper layer.

9. The circuit board assembly of claim 5, wherein the light wave guides are positioned on the circuit board by a planar light wave guide circuit technology.

10. The circuit board assembly of claim 5, wherein the circuit board assembly comprises a padding layer formed between the light wave guides and the circuit board.

11. The circuit board assembly of claim 10, wherein the padding layer is made of resin.

12. The circuit board assembly of claim 10, wherein a thickness of each light wave guide is less than the distance from each first horizontal lens to the circuit board, a sum of thicknesses of each light wave guide and the padding layer is greater than the distance from each first horizontal lens to the circuit board.

* * * * *